United States Patent
Hu et al.

(10) Patent No.: US 11,256,066 B2
(45) Date of Patent: Feb. 22, 2022

(54) OPTICAL MECHANISM

(71) Applicant: TDK TAIWAN CORP., Taoyuan (TW)

(72) Inventors: Chao-Chang Hu, Taoyuan (TW); Shu-Shan Chen, Taoyuan (TW); Cheng-Kai Yu, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 183 days.

(21) Appl. No.: 16/797,223

(22) Filed: Feb. 21, 2020

(65) Prior Publication Data

US 2020/0192063 A1 Jun. 18, 2020

Related U.S. Application Data

(63) Continuation of application No. 15/861,228, filed on Jan. 3, 2018, now Pat. No. 10,606,030, which is a (Continued)

(30) Foreign Application Priority Data

Nov. 8, 2017 (CN) .......................... 201711092011.7

(51) Int. Cl.
*G02B 7/02* (2021.01)
*G02B 13/00* (2006.01)
(Continued)

(52) U.S. Cl.
CPC ............. *G02B 13/001* (2013.01); *G02B 7/04* (2013.01); *G02B 7/08* (2013.01); *G02B 13/0065* (2013.01);
(Continued)

(58) Field of Classification Search
CPC ...... G02B 13/001; G02B 7/08; G02B 27/646; G02B 13/0065; G02B 7/04; H04N 5/2254
See application file for complete search history.

(56) References Cited

U.S. PATENT DOCUMENTS 6,389,228 B1 * 5/2002 Uenaka ................ G02B 27/646
348/208.99
2015/0042870 A1 2/2015 Chan et al.

FOREIGN PATENT DOCUMENTS

CN 101253389 A 8/2008
CN 101587174 A 11/2009
(Continued)

OTHER PUBLICATIONS

Office Action of the corresponding to Chinese application No. 201711092011.7 dated Nov. 4, 2020. (pp. 4).
(Continued)

*Primary Examiner* — James C. Jones
(74) *Attorney, Agent, or Firm* — Muncy, Geissler, Olds & Lowe, P.C.

(57) ABSTRACT

An optical element driving mechanism is provided. The optical element driving mechanism includes a movable portion, a fixed portion, a magnetic sensed assembly, a first sensing element, and a magnetically permeable element. The movable portion is connected to an optical element which corresponds to incident light. The movable portion is movably connected to the fixed portion. The magnetic sensed assembly includes a first sensed portion having a first magnetic polar direction. The first sensing element is corresponding to the magnetic sensed assembly and is used to detect the rotation of the movable portion relative to the fixed portion, with a first rotational axis extending in a first direction that is different from an incident direction of the incident light and the first magnetic polar direction. The magnetically permeable element is corresponding to the first sensing magnet.

20 Claims, 7 Drawing Sheets

Related U.S. Application Data continuation of application No. 62/441,696, filed on Jan. 3, 2017.

(51) Int. Cl.
*H04N 5/225* (2006.01)
*G02B 7/04* (2021.01)
*G02B 27/64* (2006.01)
*G02B 7/08* (2021.01)

(52) U.S. Cl.
CPC ......... *G02B 27/646* (2013.01); *H04N 5/2254* (2013.01)

(56) References Cited

FOREIGN PATENT DOCUMENTS

| | | |
|---|---|---|
| CN | 103649828 A | 3/2014 |
| JP | 2015194660 A | 11/2015 |

OTHER PUBLICATIONS

Office Action and Search Report issued in correspnding CN application No. 201711092011.7 dated Aug. 10, 2021 (7 pages).

\* cited by examiner

OPTICAL MECHANISM

CROSS-REFERENCE TO RELATED APPLICATIONS

This application is a Continuation of application Ser. No. 15/861,228, filed on Jan. 3, 2018, which claims the benefit of U.S. Provisional Patent Application No. 62/441,696, filed on Jan. 3, 2017, and China Patent Application No. 201711092011.7 filed on Nov. 8, 2017, which is incorporated by reference herein in its entirety.

BACKGROUND OF THE INVENTION

Field of the Invention

The present invention relates to an optical mechanism, and especially to an optical mechanism with a sensing element.

Description of the Related Art

With the development of technology, many electronic devices (e.g. cameras or smartphones) have functions of photographing or recording video nowadays. When it is required that a lens with a longer focal length be disposed in an electronic device, the thickness of the electronic device may increase, which is unfavorable for miniaturization of the electronic device. As a result, an optical mechanism which can reflect external light is disposed in the electronic devices for the miniaturization of the electronic devices having a lens with longer focal length. Furthermore, the optical mechanism requires a sensing element for detecting the motion of the optical element along different axes, and thus appropriately adjusting focal length and performing optical image stabilization. However, how to dispose sensing element in a limited space and avoid the detected signal from being distorted is a problem to be solved.

BRIEF SUMMARY OF THE INVENTION

An optical element driving mechanism is provided. The optical element driving mechanism includes a movable portion, a fixed portion, a magnetic sensed assembly, a first sensing element, and a magnetically permeable element. The movable portion is connected to an optical element which corresponds to incident light. The movable portion is movably connected to the fixed portion. The magnetic sensed assembly includes a first sensed portion having a first magnetic polar direction. The first sensing element is corresponding to the magnetic sensed assembly and is used to detect the rotation of the movable portion relative to the fixed portion, with a first rotational axis extending in a first direction that is different from an incident direction of the incident light and the first magnetic polar direction. The magnetically permeable element is corresponding to the first sensing magnet.

DETAILED DESCRIPTION OF THE INVENTION

Hereinafter, the optical mechanism of the embodiment of present disclosure will be described hereinafter. However, it may be easily known that the embodiments of the present invention provide many appropriate concepts and may be implements at widely different backgrounds. It should be understood that the embodiments are only for illustrating but not intended to limit the scope of the present disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The abovementioned and other technical contents, features and effects relating to the present invention are clearly shown in the description of a preferred embodiment with reference figures. The directional phrases, such as on, under, left, right, front or rear are the directions relative to the reference figures. As a result, the directional phrases are only for illustration and is not intended to restrict this invention.

Figure 1:
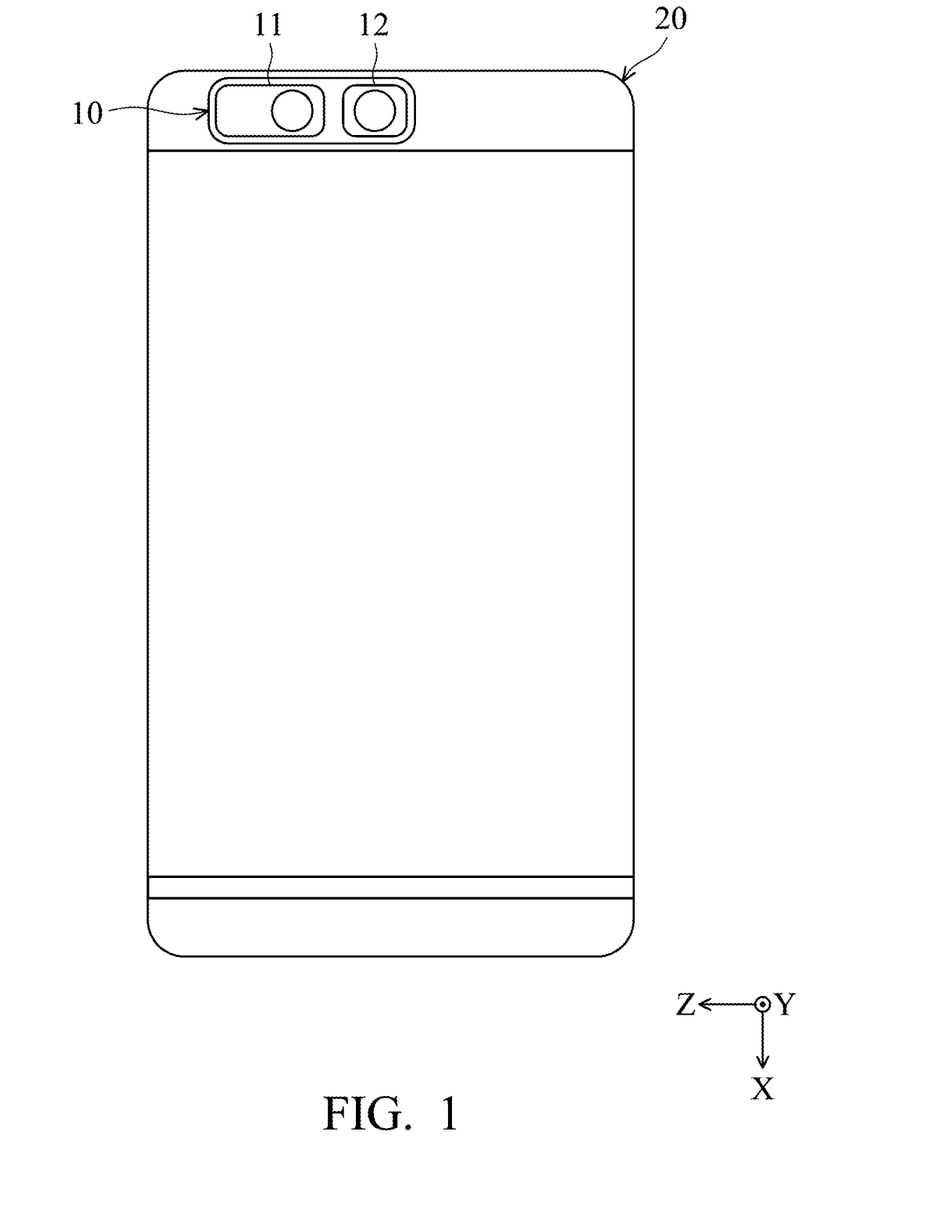
FIG. 1 is a schematic view of an electronic device of an embodiment of the present invention.

Referring to FIG. 1, according to an embodiment of the present invention, a lens system 10 may be disposed in an electronic device 20 for photographing and video recording, wherein the electronic device 20 may be, for example, a smart phone or a digital camera. The lens system 10 has two lens modules including a telephoto lens module 11 and a wide angle end lens module 12. During photographing or video recording, the two lens modules respectively receive light and imaging. The imaging may be delivered to a processor disposed in the electronic device 20 (not shown), and post-processing of the image is performed by the processor.

Figure 2:
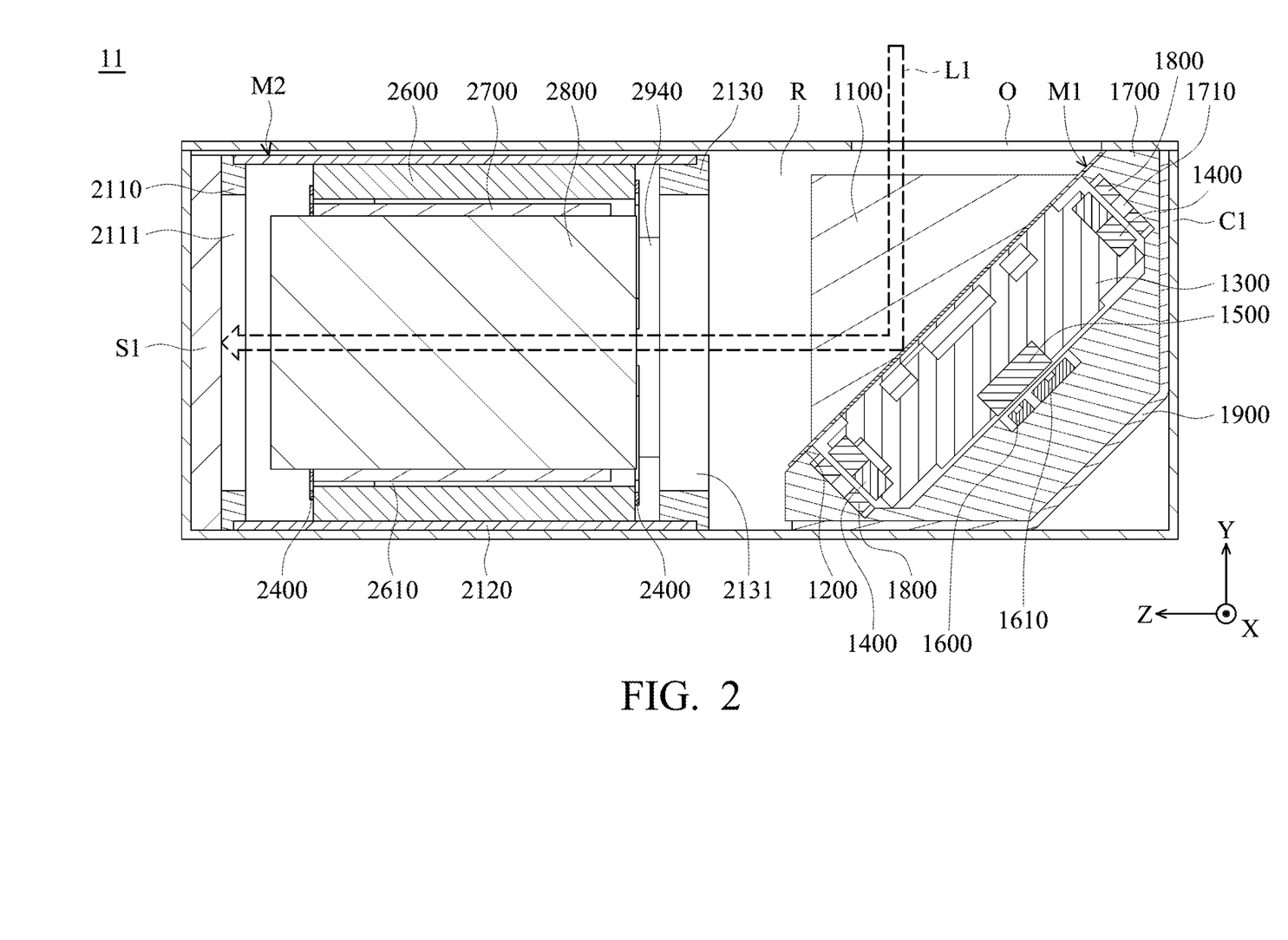
FIG. 2 is a schematic view of a telephoto lens module in FIG. 1 of the present invention.

As shown in FIG. 2, the telephoto lens module 11 includes a casing C1, a first optical mechanism M1, a second optical mechanism M2 and an image sensor S1. An accommodating space R is formed in the casing C1, and an opening O which connects to the accommodating space R is formed on a wall of the casing C1. The first optical mechanism M1, the second optical mechanism M2 and the image sensor S1 are disposed in the accommodating space R, the second optical mechanism M2 is located between the first optical mechanism M1 and the image sensor S1, and the opening O is formed above the first optical mechanism M1.

When an external light L1 passes through the opening O along the Y-axis direction and enters the accommodating space R of the telephoto lens module 11, the external light L1 may be reflected by the first optical mechanism M1. The reflected external light L1 may pass through the second optical mechanism M2 substantially along the Z-axis and reach the image sensor S1, the image sensor S1 may form an image this way.

Figure 3:
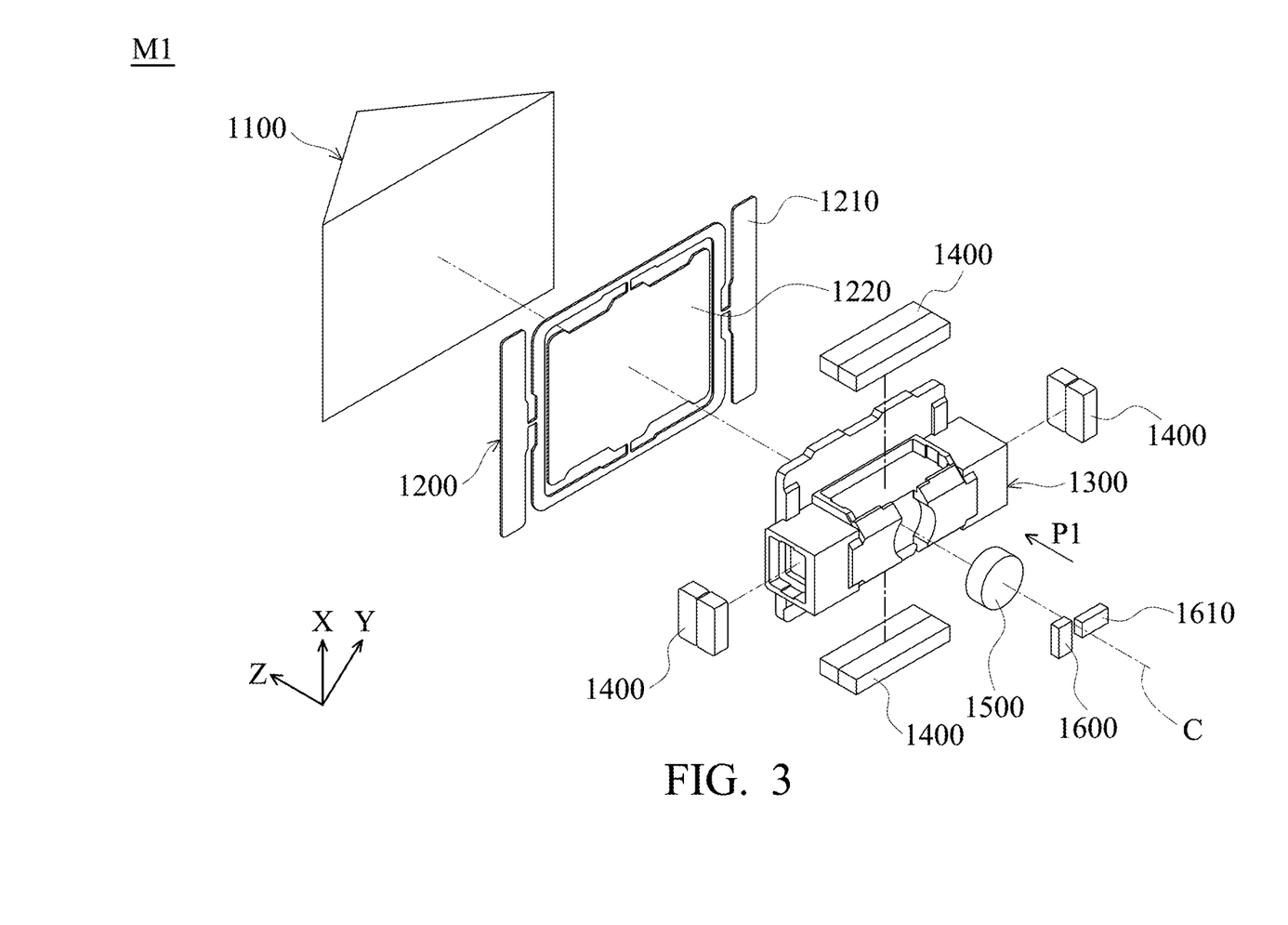
FIG. 3 is a schematic view of a first optical mechanism in FIG. 2 of the present invention.

FIG. 3 is an exploded view of the first optical mechanism M1 in FIG. 2 of the present invention. Referring to FIGS. 2 and 3, in this embodiment, the first optical mechanism M1 mainly includes a reflecting element 1100, a first resilient element 1200, a first holder 1300, a plurality of first driving magnets 1400, a first sensing magnet 1500, a first sensing element 1600, a second sensing element 1610, a first frame 1700, a plurality of first coils 1800 and a first circuit board 1900. The first frame 1700, the first coils 1800 and the first circuit board 1900 are omitted in FIG. 3 for simplicity. The reflecting element 1100, the first resilient element 1200, the first holder 1300, the plurality of first driving magnets 1400 and the first sensing magnet 1500 are substantially arranged along a center axis C. The first sensing magnet 1500 has a first magnetic polar direction P1 parallel to the center axis C.

The first resilient element 1200 has an outer segment 1210 and an inner segment 1220, wherein the first frame 1700 connects to the outer segment 1210, and the reflecting element 1100 and the first holder 1300 are respectively secured on the opposite surfaces of the inner segment 1220. In other words, the reflecting element 1100 and the first holder 1300 are connected to each other by the first resilient element 1200. Furthermore, the four first driving magnets 1400 are respectively secured on four sides of the first holder 1300, and the first sensing magnet 1500 is corresponding to the reflecting element 1100 and is secured on the bottom of the first holder 1300.

As shown in FIG. 2, the first circuit board 1900 is secured on the casing C1, and the first frame 1700, the first coil 1800, the first sensing element 1600 and the second sensing element 1610 are secured on the first circuit board 1900. The first coil 1800 and the first and second sensing elements 1600 and 1610 may extend through a hole 1710 on the first frame 1700. The first coil 1800 corresponds to the first driving magnet 1400, and the first sensing element 1600 and the second sensing element 1610 correspond to the first sensing magnet 1500 and may be used for detecting the position of the first sensing magnet 1500.

Figure 5A:
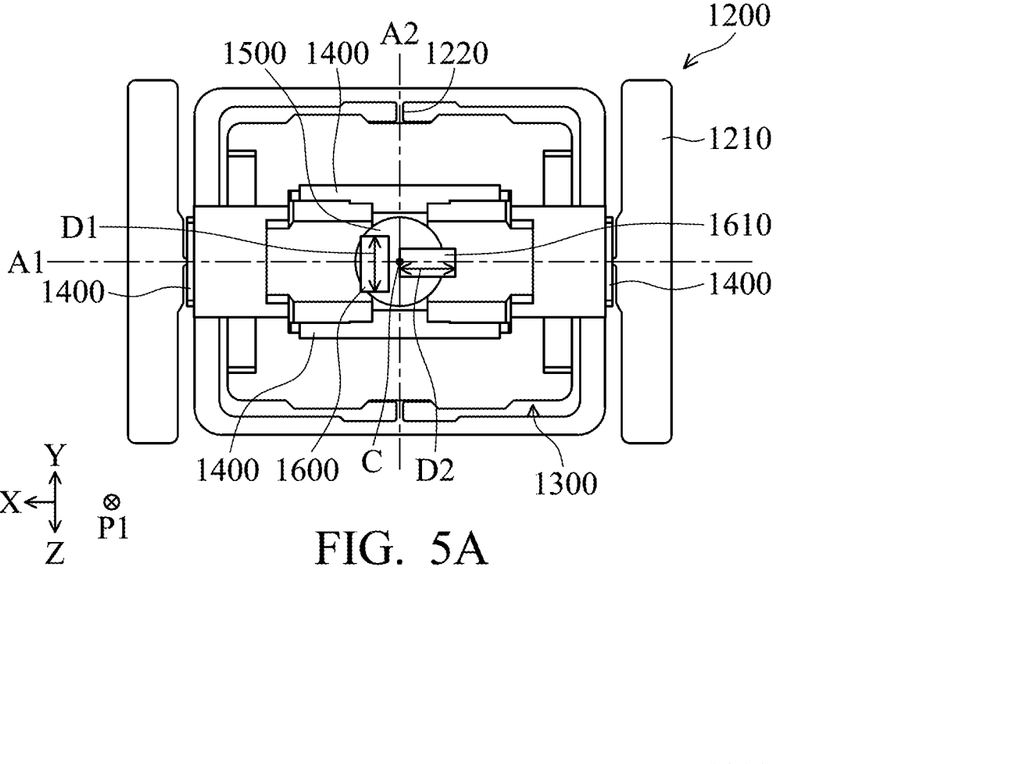
FIG. 5A is a schematic view of the relative position of a first resilient element, a first holder, a first driving magnet, a first sensing magnet, a first sensing element and a second sensing element in FIG. 3 after assembly.

The first resilient element 1200 may allow the reflecting element 1100 and the first holder 1300 movably connect to the first frame 1700, wherein the first resilient element 1200 and first holder 1300 act as a movable member movably connecting to the first frame 1700 which acts as a fixed member, and the reflecting element 1100 is an optical element disposed on the first holder 1300. When a user passes current into the first coil 1800, a magnetic force may be created between the first coil 1800 and the first driving magnet 1400 to allow the reflecting element 1100 and the first holder 1300 rotate around a first axis A1 parallel to the X-axis direction and/or around a second axis A2 parallel to the Y-axis direction relative to the first frame 1700 (as shown in FIG. 5A), to fine tune the position where the external light L1 reaches the image sensor S1. The reflecting element 1100 may be a prism. However, the first sensing magnet 1500 may also be disposed on the first frame 1700 (fixed member), and the first sensing element 1600 and the second sensing element 1610 may be disposed on the first holder 1300 (movable member).

The first sensing element 1600 and the second sensing element 1610 may be a magnetoresistance effect sensor (MR sensor), such as giant magnetoresistance effect sensor (GMR sensor), tunneling magnetoresistance effect sensor (TMR sensor), ordinary magnetoresistance effect sensor (OMR sensor), colossal magnetoresistance effect sensor, (CMR sensor) or anisotropic magnetoresistance effect sensor (AMR sensor), and the first sensing element 1600 and the second sensing element 1610 may be integrated in the same integrated circuit element. MR sensor has a higher sensitivity, and its polar direction has directivity, so it may not be influenced by interferences from other axis directions which lead signal distortion. As a result, using different sensing elements corresponding to the same sensing magnet may be able to measure the rotations at different axis directions, the dimensions of the sensing magnet may be reduced, and the focal length of the optical mechanism may be much precisely adjusted in a limited space.

Figure 4:
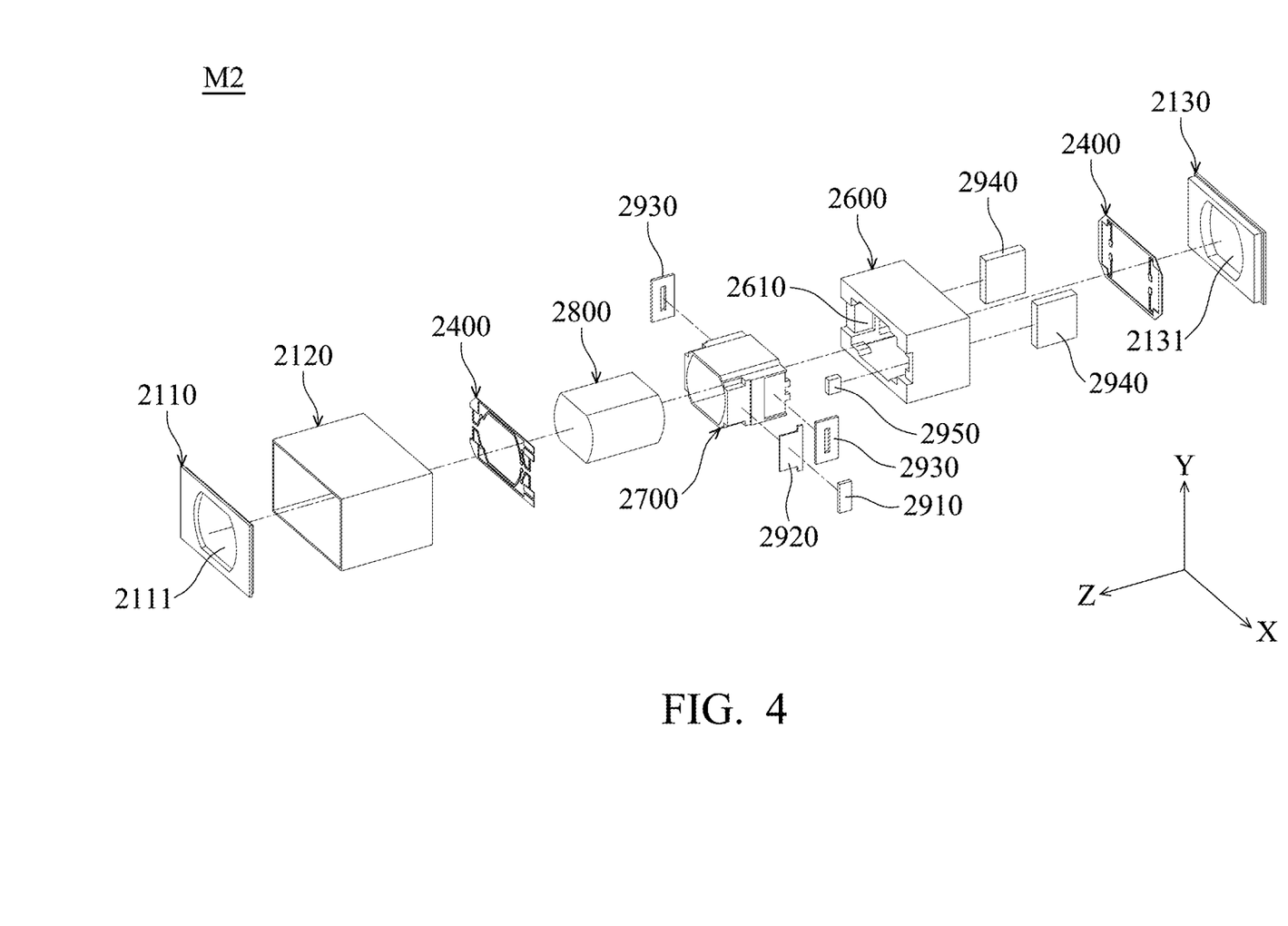
FIG. 4 is a schematic view of a second optical mechanism in FIG. 2 of the present invention.

FIG. 4 is an exploded view of the second optical mechanism M2 in FIG. 2 of the present invention. As shown in FIGS. 2 and 4, the second optical mechanism M2 mainly includes a top cover 2110, a case 2120, a bottom cover 2130, a focusing element 2800, two second resilient elements 2400, a second frame 2600, a second holder 2700, a third axis position sensor 2910, a second circuit board 2920, two second coils 2930, two second driving magnets 2940 and a third axis position sensory object 2950.

The two second resilient elements 2400 connect to the second frame 2600 and the second holder 2700, and respectively locate at opposite sides of the second holder 2700 to allow the second holder 2700 movably be suspended in a hollow portion 2610 of the second frame 2600. The focusing element 2800 is disposed in the second holder 2700 and is supported by the second holder 2700. The second coil 2930 and the second driving magnet 2940 are respectively disposed on the second holder 2700 and the second frame 2600, and is corresponding to each other. In the X-axis direction, the two second coils 2930 are located at opposite sides of the second holder 2700, and the two second driving magnets 2940 are disposed on the opposite inner surface of the second frame 2600. When a current is passed through the second coil 2930, an electromagnetic induction may occur between the second coil 2930 and the second driving magnet 2940. As a result, the second holder 2700 and the focusing element 2800 may move along the Z-axis direction (the third axis direction) relative to the second frame 2600.

The third axis position sensory object 2950 is secured on the second frame 2600. The second circuit board 2920 is secured on the second holder 2700, and the third axis position sensor 2910 is disposed on the second circuit board 2920. As a result, the second circuit board 2620 and the third axis position sensor 2910 may be moved with the second holder 2700 when the second holder 2700 is moved. When the second holder 2700 is moved, the third axis position sensor 2910 may detect the relative position of the third axis position sensory object 2950.

The third axis position sensor 2910 may be a Hall sensor, MR Sensor, GMR Sensor, TMR sensor, OMR sensor, CMR sensor, AMR sensor, optical encoder or infrared sensor.

When using a Hall sensor, MR Sensor, GMR Sensor, TMR sensor, OMR sensor, CMR sensor or AMR sensor as the third axis position sensor 2910, the third axis position sensory object 2950 may be a magnet. When using optical encoder or infrared sensor as the third axis position sensor 2910, the third axis position sensory object 2950 may be a reflector.

Still referring to FIG. 4, the top cover 2110 and the bottom cover 2130 may be disposed on two sides of the case 2120 and assembled with the case 2120 to form a box-shaped structure, wherein the second resilient element 2400, the second frame 2600, the second holder 2700, the focusing element 2800, the third axis position sensor 2910, the second circuit board 2920, the second coils 2930, the second driving magnets 2940 and the third axis position sensory object 2950 are accommodated in this box-shaped structure.

In this embodiment, the top cover 2110, the case 2120 and the bottom cover 2130 may comprise insulating material, so that short circuit or interfering between the first optical mechanism M1 and the second optical mechanism M2 may be prevented. It should be noted that the through holes 2111 and 2131 are respectively formed on the top cover 2110 and the bottom cover 2130, wherein the positions of the through holes 2111 and 2131 correspond to each other. Therefore, the external light L1 which is reflected by the first optical mechanism M1 and moves along the Z-axis direction (the third axis direction) may successfully pass through the through hole 2131 of the bottom cover 2130 to reach the focusing element 2800, and it may successfully pass through the through hole 2111 of the top cover 2110 and reaches the image sensor S1. The focusing element 2800 may be an optical lens.

In this embodiment, the first optical mechanism M1 may drive the reflecting element 1100 to rotate around the first axis A1 parallel to the X-axis direction and/or around the second axis A2 parallel to the Y-axis direction (as shown in FIG. 5A), so the position of where the external light L1 reaches the image sensor S1 may be adjusted to achieve the function of optical image stabilization (OIS). Furthermore, the second optical mechanism M2 may drive the focusing element 2800 to move along the Z-axis direction (the third axis direction), so the distance between the focusing element 2800 and the image sensor S1 may be adjusted to achieve the function of auto focus (AF).

FIG. 5A is a schematic view of the relative position of the first resilient element 1200, the first holder 1300, the first driving magnet 1400, the first sensing magnet 1500, the first sensing element 1600 and the second sensing element 1610 after assembly when viewed from the central axis C direction in FIG. 3. As shown in FIG. 5A, the first holder 1300 is secured on the inner segment 1220 of the first resilient element 1200. Furthermore, the four first driving magnets 1400 are secured on four sides of the first holder 1300, and the first sensing magnet 1500 is secured on the bottom of the first holder 1300 wherein the first sensing magnet 1500 is circular and has a first magnetic polar direction P1 which is parallel to the central axis C and perpendicular to the first axis A1.

Still referring to FIG. 5A, the positions of the first sensing element 1600 and the second sensing element 1610 are corresponding to the first sensing magnet 1500, and the first sensing element 1600 and the second sensing element 1610 may be at least partially overlapped with the first sensing magnet 1500 when viewed from the first magnetic polar direction P1. It is worth noted that a projected area of the first sensing magnet 1500 on a reference plane which is perpendicular to the central axis C and the first magnetic polar direction P1 is larger than a projected area of the first sensing element 1600 on this reference plane, as shown in FIG. 5A. In this embodiment, the first sensing element 1600 may be used for detecting the rotation of the first sensing magnet 1500 around the first axis A1 relative to the first frame 1700, and it has a first magnetic direction D1 which is perpendicular to the first axis A1 and the first magnetic polar direction P1. Furthermore, the second sensing element 1610 may be used for detecting the rotation of the first sensing magnet 1500 around the second axis A2 relative to the first frame 1700, and it has a second magnetic direction D2 which is perpendicular to the second axis A2 and the first magnetic polar direction P1.

Figure 5B:
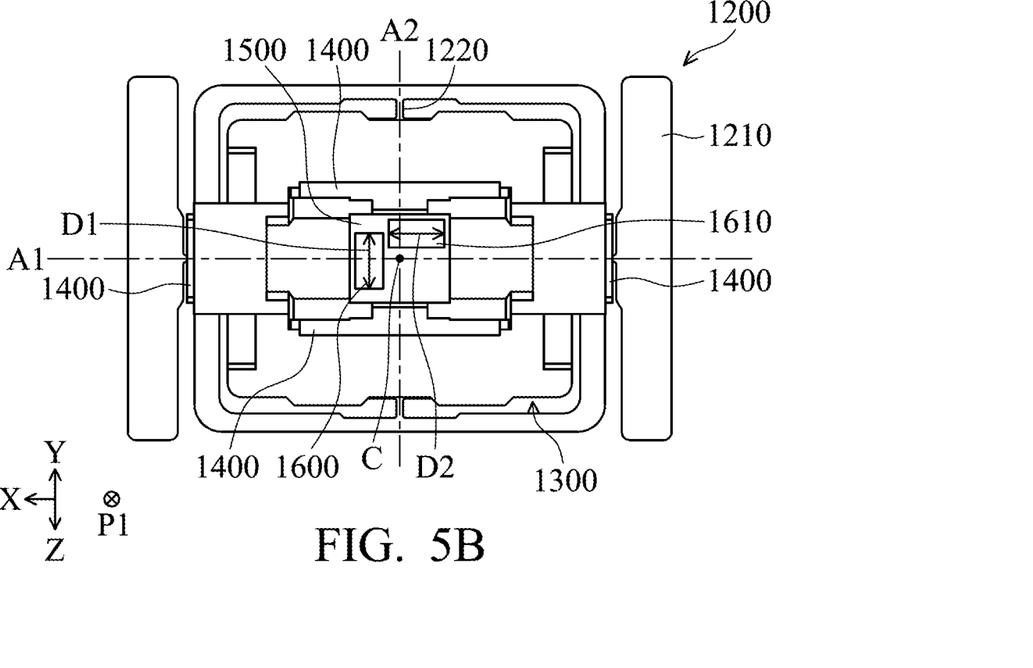
FIG. 5B is a schematic view of the relative position of a first resilient element, a first holder, a first driving magnet, a first sensing magnet, a first sensing element and a second sensing element after assembly in another embodiment of the present invention.

However, the first magnet 1500, the first sensing element 1600 and the second sensing element 1610 may be disposed in other different ways. As shown in FIG. 5B, in this embodiment, the first sensing magnet 1500 is rectangular or square, and the positions of the first sensing element 1600 and the second sensing element 1610 are respectively adjacent to different sides of the first sensing magnet 1500 to achieve better detecting result.

Figure 5C:
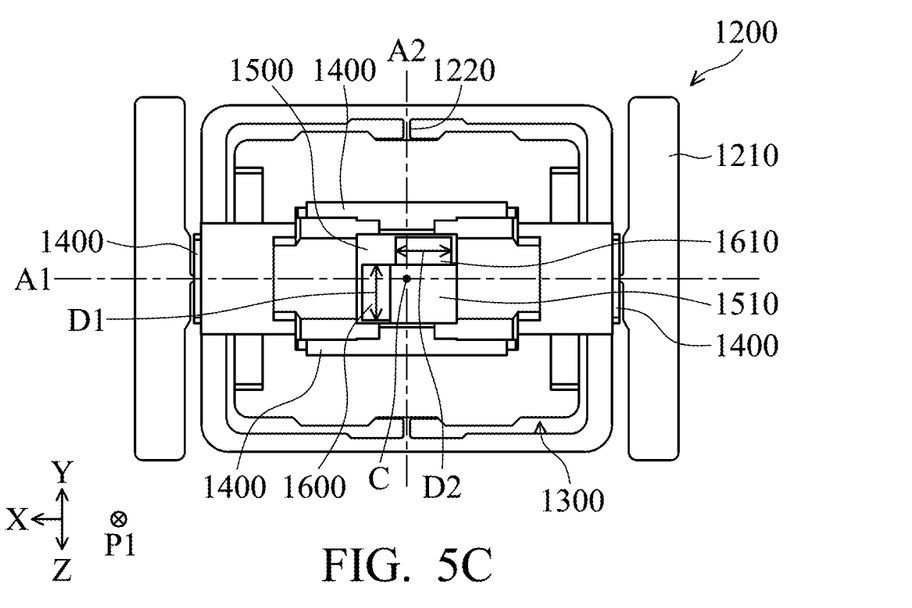
FIG. 5C is a schematic view of the relative position of a first resilient element, a first holder, a first driving magnet, a first sensing magnet, a magnetically permeable element, a first sensing element and a second sensing element after assembly in another embodiment of the present invention.

Referring to FIG. 5C, which is a schematic view of the relative position of the first resilient element 1200, the first holder 1300, the first driving magnet 1400, the first sensing magnet 1500, the magnetically permeable element 1510, the first sensing element 1600 and the second sensing element 1610 after assembly, according to another embodiment of the present invention. In this embodiment, a magnetically permeable element 1510 is disposed to partially cover an end surface of the first sensing magnet 1500 which faces toward the first sensing element 1600 and the second sensing element 1610, and the positions of the first sensing element 1600 and the second sensing element 1610 are respectively located adjacent to different sides of the magnetically permeable element 1510 and correspond to a portion of the first sensing magnet 1500 which is not covered by the magnetically permeable element 1510 for achieving better detecting result.

Figure 5D:
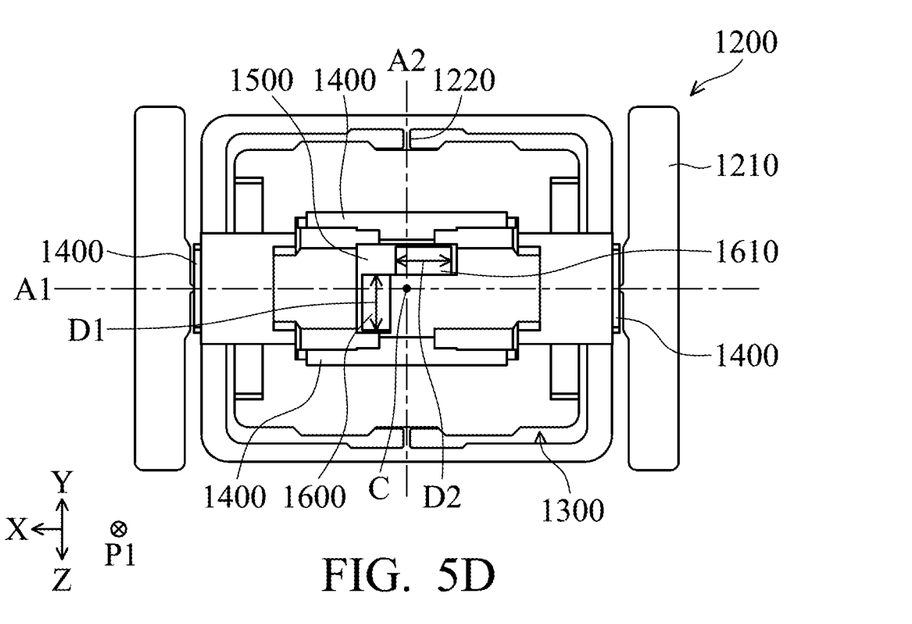
FIG. 5D is a schematic view of the relative position of a first resilient element, a first holder, a first driving magnet, a first sensing magnet, a first sensing element and a second sensing element after assembly in another embodiment of the present invention.

Referring to FIG. 5D, which is a schematic view of the relative position of the first resilient element 1200, the first holder 1300, the first driving magnet 1400, the first sensing magnet 1500, the first sensing element 1600 and the second sensing element 1610 after assembly, according to another embodiment of the present invention. In this embodiment, the first sensing magnet 1500 is L-shaped, and the first sensing element 1600 and the second sensing element 1610 are respectively corresponding to two protruding portions perpendicular to each other and adjacent to the sides of the first sensing magnet 1500 for achieving better detecting result.

Figure 5E:
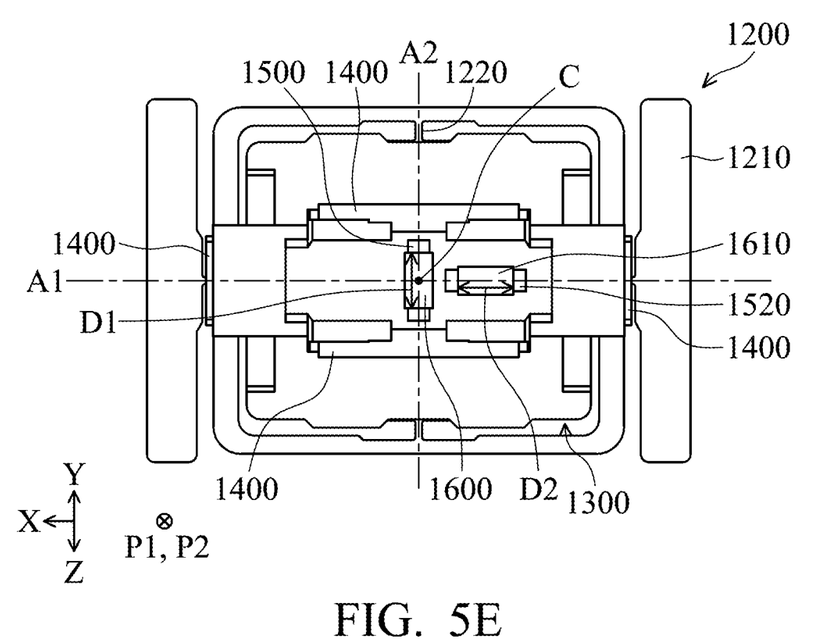
FIG. 5E is a schematic view of the relative position of a first resilient element, a first holder, a first driving magnet, a first sensing magnet, a first sensing element and a second sensing element after assembly in another embodiment of the present invention.

Referring to FIG. 5E, which is a schematic view of the relative position of the first resilient element 1200, the first holder 1300, the first driving magnet 1400, the first sensing magnet 1500, the second sensing magnet 1520, the first sensing element 1600 and the second sensing element 1610 after assembly, according to another embodiment of the present invention. In this embodiment, the first sensing magnet 1500 and the second sensing magnet 1520 are rectangle and substantially perpendicular to each other, wherein the second sensing magnet 1520 has a second magnetic polar direction P2 which is parallel to the first magnetic polar direction P1. It should be noted that the positions of the first sensing element 1600 and the second sensing element 1610 are respectively corresponding to the first sensing magnet 1500 and the second sensing magnet 1520, so they may be used for detecting the rotation of the first sensing magnet 1500 and the second sensing magnet 1520 respectively around the first axis A1 and the second axis A2 relative to the first frame 1700.

In conclusion, an optical mechanism having sensing element, for example, the first optical mechanism M1 or the second optical mechanism M2 but is not limited thereto is provided in this invention. The first sensing element is corresponding to the first sensing magnet which has the first magnetic polar direction. As a result, the rotation of the first sensing magnet around the first axis which perpendicular to the first magnetic polar direction relative to the fixed member may be detected. For example, the first sensing element may be an MR sensor instead of a conventionally used Hall Effect sensor to improve the problem that using a Hall Effect sensor may be easily affected by interference from other axis directions, which results signal distortion. Furthermore, the dimensions of the sensing magnets may also be reduced. As a result, the optical mechanism may be assisted to much precisely adjust focal length and perform OIS function in a limited space.

The description above is only embodiments of the present the disclosure, and should not be used to limit the present disclosure. For a person skilled in the art, various changes and variations may be included in the present disclosure. The features of the embodiments may be used together and depend on the requirements, and is not limited. Any variation, equivalent replacement and improvement in the spirit and principle of the present disclosure should be protected in the present disclosure.

What is claimed is:

1. An optical element driving mechanism, comprising:
   a movable portion connected to an optical element which corresponds to incident light;
   a fixed portion, wherein the movable portion is movably connected to the fixed portion;
   a magnetic sensed assembly, comprising a first sensed portion having a first magnetic polar direction;
   a first sensing element corresponding to the magnetic sensed assembly and is used to detect the rotation of the movable portion relative to the fixed portion, with a first rotational axis extending in a first direction that is different from an incident direction of the incident light and the first magnetic polar direction; and
   a magnetically permeable element corresponding to the first sensing magnet.

2. The optical element driving mechanism as claimed in claim 1, wherein the magnetic sensed assembly further comprises a second sensed portion having a second magnetic polar direction, and the first magnetic polar direction is different from the second magnetic polar direction.

3. The optical element driving mechanism as claimed in claim 2, wherein the magnetic permeable element at least partially overlaps the first sensed portion and the second sensed portion when viewed in a direction where the first sensing element and the magnetic sensed assembly arranged.

4. The optical element driving mechanism as claimed in claim 3, wherein the magnetic permeable element covers entire of the first sensed portion and entire of the second sensed portion when viewed in a direction where the first sensing element and the magnetic sensed assembly arranged.

5. The optical element driving mechanism as claimed in claim 3, wherein the first sensed portion and the second sensed portion are arranged in a direction that is not parallel to the first direction.

6. The optical element driving mechanism as claimed in claim 2, wherein the first sensed portion does not overlap the second sensed portion when viewed in the first direction.

7. The optical element driving mechanism as claimed in claim 6, further comprises a second sensing element corresponding to the magnetic sensed assembly for detecting the rotation of the movable portion relative to the fixed portion, with a second first rotational axis extending in second first direction, wherein the first sensing element does not overlap the second sensing element when viewed in the first direction.

8. The optical element driving mechanism as claimed in claim 7, wherein the first sensed portion totally covers the second sensing element when viewed in a direction that the second sensing element arranged with the magnetic sensed assembly.

9. The optical element driving mechanism as claimed in claim 1, wherein the first sensed portion totally covers the first sensing element when viewed in a direction that the first sensing element arranged with the magnetic sensed assembly.

10. The optical element driving mechanism as claimed in claim 1, further comprises a second sensing element corresponding to the magnetic sensed assembly for detecting the rotation of the movable portion relative to the fixed portion, with a second first rotational axis extending in second first direction, wherein the magnetic sensed assembly further comprises a second sensed portion having a second magnetic polar direction and corresponds to the second sensing element, wherein the first sensed portion does not overlap the entire first sensing element when viewed in the second magnetic polar direction.

11. The optical element driving mechanism as claimed in claim 10, wherein the second sensed portion does not overlap the entire second sensing element when viewed in the first magnetic polar direction.

12. The optical element driving mechanism as claimed in claim 10, wherein each of the first sensing element and the second sensing element at least overlaps a side of the first sensed portion when viewed in the first magnetic polar direction.

13. The optical element driving mechanism as claimed in claim 12, wherein each of the first sensing element and the second sensing element at least overlaps a side of the magnetic permeable element when viewed in the first magnetic polar direction.

14. The optical element driving mechanism as claimed in claim 1, wherein the first sensing element has a rectangular shape, and a length direction of the first sensing element is different from the first magnetic polar direction.

15. The optical element driving mechanism as claimed in claim 14, further comprises a second sensing element corresponding to the magnetic sensed assembly, and the first sensing element extends and the second sensing element extend in different directions.

16. The optical element driving mechanism as claimed in claim 15, wherein the first sensing element and the second sensing element are disposed on an identical side of the optical element.

17. The optical element driving mechanism as claimed in claim 1, wherein the magnetic permeable element is disposed between the magnetic sensed assembly and the first sensing element.

18. The optical element driving mechanism as claimed in claim 1, wherein the first direction is different than the incident direction.

19. The optical element driving mechanism as claimed in claim 1, further comprising a magnetic driving element, wherein the magnetic driving element and the magnetic permeable element are disposed on an identical side of the optical element.

20. The optical element driving mechanism as claimed in claim 19, wherein the magnetic driving element and the first sensing element are disposed on an identical side of the optical element.

* * * * *